UNITED STATES PATENT OFFICE.

HEINRICH CARO, OF MANNHEIM, GERMANY, AND ALFRED KERN, OF BASLE, SWITZERLAND, ASSIGNORS TO THE BADISCHE ANILIN AND SODA FABRIK, OF MANNHEIM, GERMANY.

MANUFACTURE OF PURPLE-BLUE COLORING-MATTER.

SPECIFICATION forming part of Letters Patent No. 308,748, dated December 2, 1884.

Application filed September 22, 1884. (Specimens.) Patented in Germany December 18, 1883, No. 27,789, and in France January 25, 1884, No. 160,090.

*To all whom it may concern:*

Be it known that we, HEINRICH CARO, a subject of the Grand Duke of Baden, residing at Mannheim, in the Empire of Germany, and ALFRED KERN, a citizen of the Swiss Republic, residing at Basle, Switzerland, have invented new and useful Improvements in the Manufacture of Dye-Stuff or Coloring-Matter, of which the following is a specification.

This invention relates to the production of a purplish-blue dye-stuff or coloring-matter produced by the condensation of tetramethyldiamidobenzophenone with methylphenylalphanaphthylamine.

In carrying out our invention we take about seven parts, by weight, of dry and finely-powdered tetramethyldiamidobenzophenone, and mix the same intimately with about six parts, by weight, of methylphenylalphanaphthylamine, and we then add about five parts, by weight, of oxychloride of phosphorus. The mixture thus obtained is kept constantly stirred until the reaction which spontaneously sets in, and which manifests itself by a considerable rise of temperature, gradually begins to subside. We then heat the semi-fluid dark-colored product thus obtained up to a temperature of about 110° centigrade, and we maintain the said temperature during about half an hour, or until a stiff bronze-colored "melt" is obtained, which solidifies upon cooling.

In order to separate our new purplish-blue coloring-matter thus produced the said melt is powdered and boiled up with about one hundred parts of water until the particles of the powder have again entered into fusion and conglomerated into a tar-like mass. After cooling, the coloring-matter thus purified is mechanically separated from the green and acid mother-liquor and dried at a temperature of about 50° centigrade.

The purplish-blue dye-stuff or coloring-matter prepared by the above process, and which we term "Victoria Blue 4R," presents the general characteristics of "Victoria Blue B," the dye-stuff prepared from tetramethyldiamidobenzophenone and phenylalphanaphthylamine substantially by the same process, and which forms the subject-matter of Letters Patent granted to Alfred Kern (one of the applicants in this present case) on the 22d day of April, 1884, and numbered 297,414. Victoria Blue 4R principally differs from said Victoria Blue B by the more purplish or violet hue of the shades which it is capable of producing in dyeing and printing when employed in the same manner as the Victoria Blue B.

What we claim as new, and desire to secure by Letters Patent, is—

The purplish-blue coloring-matter produced by the condensation of tetramethyldiamidobenzophenone with methylphenylalphanaphthylamine, and having the characteristics above described.

In testimony whereof we have hereunto set our hands and seals in the presence of two subscribing witnesses.

HEINRICH CARO. [L. S.]
ALFRED KERN. [L. S.]

Witnesses as to Heinrich Caro:
   JOHANNES BÜTTNER,
   RICHARD MITTLER.
Witnesses as to Alfred Kern:
   N. KENZI,
   CHS. A. RICHTER.